United States Patent [19]

Mraz

[11] 3,770,123
[45] Nov. 6, 1973

[54] METHOD AND APPARATUS FOR GRADING SHRIMP

[75] Inventor: Joseph Mraz, Plant City, Fla.

[73] Assignee: Mraz Research Center, Ltd., Plant City, Fla.

[22] Filed: Aug. 13, 1971

[21] Appl. No.: 171,609

[52] U.S. Cl. ............................................. 209/107
[51] Int. Cl. ............................................ B07c 1/10
[58] Field of Search .............................. 209/99, 107

[56] References Cited
UNITED STATES PATENTS

| | | | |
|---|---|---|---|
| 2,702,628 | 2/1955 | Lucius | 209/107 |
| 2,792,113 | 5/1957 | Minera | 209/107 |
| 2,989,180 | 6/1961 | Merrick | 209/107 |
| 3,108,691 | 10/1963 | Vance | 209/107 |

Primary Examiner—Richard A. Schacher
Attorney—Burns, Doane, Swecker & Mathis and A. Donald Messenheimer

[57] ABSTRACT

An apparatus for grading shrimp according to size wherein pairs of spindles having precisely cylindrical sections of progressively decreasing diameter are utilized. The spindles are generally parallel, extend longitudinally within a frame sloping downwardly from one end of the frame to the other, and the pairs of spindles are rotated in opposite directions with facing surfaces moving upwardly. Precise grading of shrimp may be accomplished with one pass through the machine. A loading conveyor is provided to control the rate of feed of shrimp delivered to the spindles. Collecting devices are employed to keep separate shrimp falling through the grading regions of different size.

12 Claims, 4 Drawing Figures

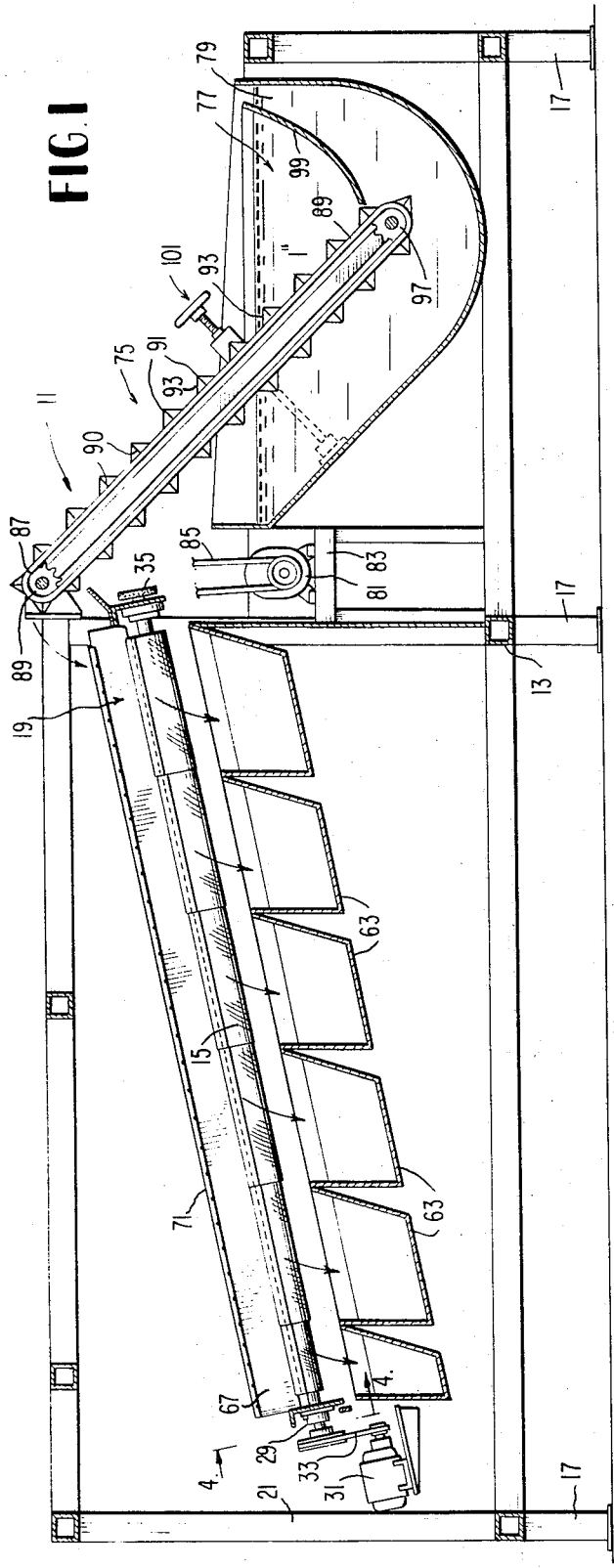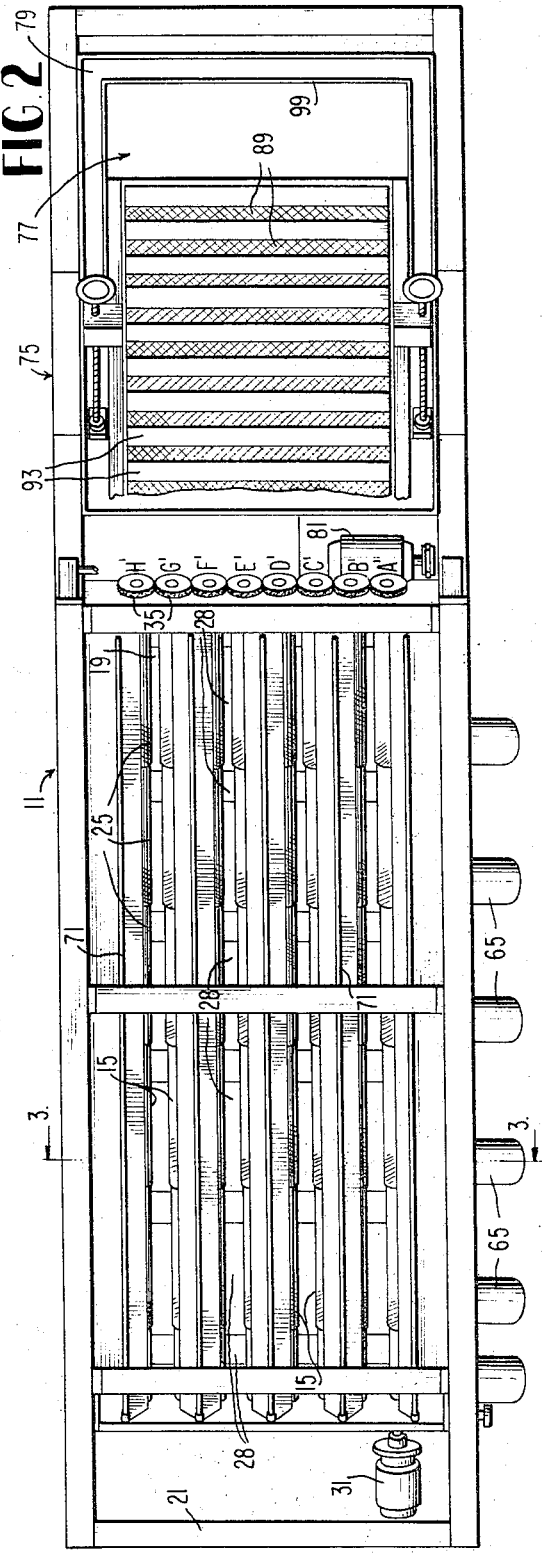

METHOD AND APPARATUS FOR GRADING SHRIMP

BACKGROUND OF THE INVENTION

The present invention relates to a sorting and grading apparatus for automatically separating and distributing shrimp according to size.

The food industry has been engaged in efforts to increase the efficiency of its operations and to make them more economical by utilizing automatic food-handling equipment. The sorting of foods according to size has long been a task which, when done manually, requires a certain amount of skill and repetitive manual labor that increases the cost of manufacturing such food products. The sorting of shrimp is such a task which presents peculiar problems not encountered when sorting many other foods. The sorting according to size occurs promptly after the shrimp are caught and the head is removed, and prior to initial processing or packaging.

Prior art shrimp sorting machines, such as those disclosed in U.S. Pat. Nos. 2,702,628 and 2,989,180, are representative of prior equipment presently in use for grading shrimp at shrimp houses which receive the shrimp as brought in by boats. These machines are provided with pairs of stepped spindles whose axes are somewhat divergent to form openings having narrow measurements for passing small shrimp only and gradually progressing to wider measurements. A series of compartments are provided to collect shrimp of the same size. The purpose of using these machines is to grade the shrimp according to size since the price of shrimp per pound varies greatly. For example, on a given day, small shrimp having a count of 50 or more per pound may bring 70 cents whereas large shrimp having a count of 15 to 20 per pound may bring $2.00. Shrimp having a count of 21–25 per pound may bring $1.70, a count of 26–30 per pound may bring $1.40, a count of 31–35 per pound may bring $1.15, and a count of 36–40 per pound may bring $1.00.

Because of the price differential and the marketing considerations attaching to shrimp of different sizes, it is important that the grading be done with great accuracy, and that from six to 10 size classifications be provided. The prior art machines do not have sufficient accuracy to allow a catch to be satisfactorily graded during one pass through a machine, and therefore most shrimp houses have two or three machines for sequentially processing the shrimp, and even then their accuracy is not satisfactory.

Classification or grading of shrimp by size presents several problems. Shrimp have a tendency to stick to a rotating spindle thereby preventing their free movement from one end of the spindle to the other. This can cause bunching, in which case small shrimp stay in the machine longer than they should and thus fall into compartments for larger shrimp.

The spindles utilized in these prior art shrimp sorters have a slightly non-circular cross section. This shape causes the shrimp to bounce or be jostled as they advance along the length of the spindles. As a result of the elliptical, cross-sectional shape of the spindles and other factors such as the relative nominal diameters of the stepped sections, the accuracy of shrimp sorting is insufficient for commercial purposes. Also, the vibration and shaking of the machine results in excessive noise and wear in the rotating drive mechanism utilized in the machine.

A conveyor utilized with these prior art sorting machines for loading the shrimp to the input region of the machine requires the presence of an operator for spreading the shrimp to prevent them from falling off the sides of the conveyor. No adjustments are provided for controlling the rate of delivery of shrimp being supplied to the grading rollers, the shrimp being customarily carried to a sorting machine in batches.

In the prior art machines, shrimp were loaded on top of the spindles and to avoid jamming problems, each trough-like structure comprised four spindles with the upper pair of spindles intended to initially screen out from the lower pair of spindles the larger sized shrimp. This is also necessary in prior art shrimp sorting machines since loading of the machines is of an uneven and irregular nature, and the sorting machines are normally loaded for short intervals beyond their capacity. Accuracy of grading is thus affected.

OBJECTS AND SUMMARY OF THE INVENTION

It is a general object of the present invention to provide a novel shrimp sorting method and apparatus for receiving and accurately sorting shrimp according to size and which can be employed with greater speed and efficiency to reduce costs.

Another object is to provide a novel shrimp sorting method and apparatus which provides sufficient accuracy of sorting during one pass through the apparatus as to meet commercial requirements by causing the shrimp to be positively moved from an input position at the loading station to an output position, depending on the size of the particular shrimp being sorted.

A further object is to provide a novel shrimp grading apparatus wherein the rate of loading shrimp to the grading spindles may be maintained at a substantially uniform rate, thereby making it possible to prevent overloading of the grading apparatus and provide improved accuracy of the sorting process. Efficiency of operation of the apparatus can be optimized by having a variable, but controlled, rate of feed of the shrimp into the apparatus.

Yet another object of the invention is to provide novel adjusting mechanism for making fine adjustments to the spacings between the generally parallel spindles in order to improve the precision of the sorting operation.

A still further object is to eliminate from the prior shrimp sorting machines the upper pair of rollers and to substitute a sheet of plastic material which serves to loosen any shrimp that may stick to the spindles and to guide the shrimp to their proper position between the spindles.

In the preferred embodiment to be described, spaced parallel spindles cut in steps of certain length and having precisely cylindrical outer surfaces and sloping relative to the horizontal are utilized. The spindles are provided with a surface finish so arranged as to act in a screw-like manner to positively feed the shrimp from the input end to the output end without damaging the shrimp. The shrimp stand in a vertical manner with their tails extending downwardly in the slots between the spindles and are positively driven by the screw-like surface finish. The shrimp remain in constant contact with the spindles until they fall between the facing spindle surfaces.

A novel conveyor assembly is provided which loads the shrimp from an output bin to the loading area of the spindles. This conveyor is provided with an endless belt which has cross bars which have surfaces sufficiently small so that the volume of shrimp being delivered to the spindles can be limited to that which can be efficiently handled by the grading apparatus without stacking or piling of the shrimp on top of each other. The spindles are driven at a constant speed, less than about 500 r.p.m., and the conveyor is driven from an independent variable speed motor so that the speed of operation of the conveyor may be increased or decreased depending on the assortment of sizes of shrimp being graded.

An adjustment mechanism is provided to control with great precision the spacing between the spindles. This adjustment operates by maintaining alternate ones of the stepped spindles in fixed bearing housings and moving the remaining alternate spindles relative thereto. The movable spindles, instead of sliding horizontally, pivot about an axis at one end of the bearing housings and may be swung toward or away from the fixed spindles by means of a slide assembly and links.

A frictional drive including rubber drive wheels is preferably provided to rotate the various spindles from a single driven spindle. One of the spindles having a fixed bearing housing is driven by the drive motor with the remaining spindles being driven therefrom by the drive wheels. The drive wheels are located on the ends of the spindles opposite from the end being driven from the motor and where the spacing adjustment is made.

The sorting machine is also provided with a spraying apparatus which is mounted above the stepped spindles to keep the rollers constantly lubricated and clean.

Chutes are provided below the spindles and separated according to each stepped section of the spindles. These chutes feed the shrimp outwardly of the frame of the machine to receptacles or to a subsequent processing operation.

THE DRAWINGS

FIG. 1 is a side elevation, partially in section, of the shrimp sorting machine;

FIG. 2 is a top plan view of the shrimp sorter of FIG. 1, including a partially removed section showing details of the stepped spindles;

DETAILED DESCRIPTION

Figure 3:
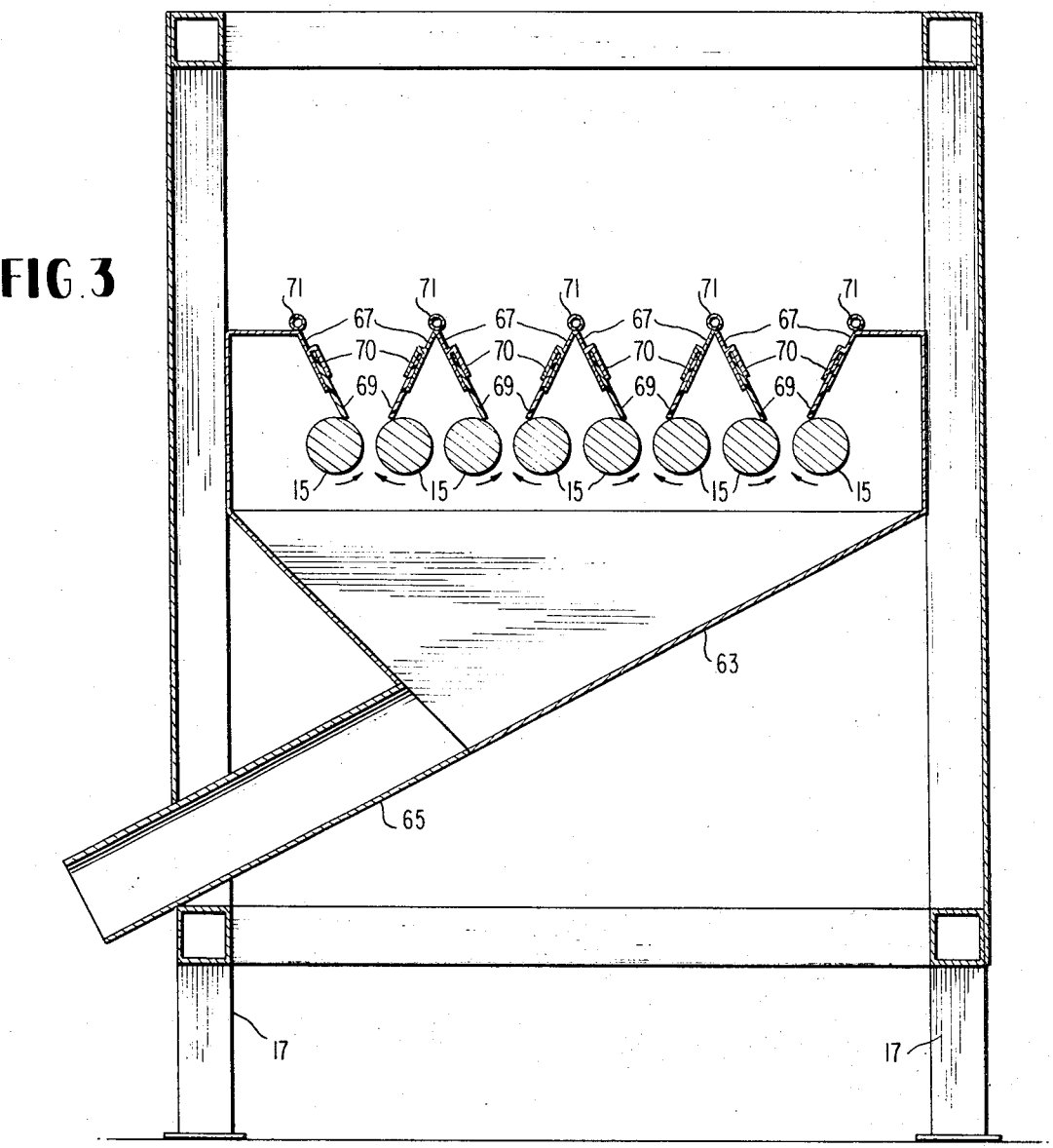
FIG. 3 is an end view in section taken along lines 3—3 of FIG. 2.
Figure 4:
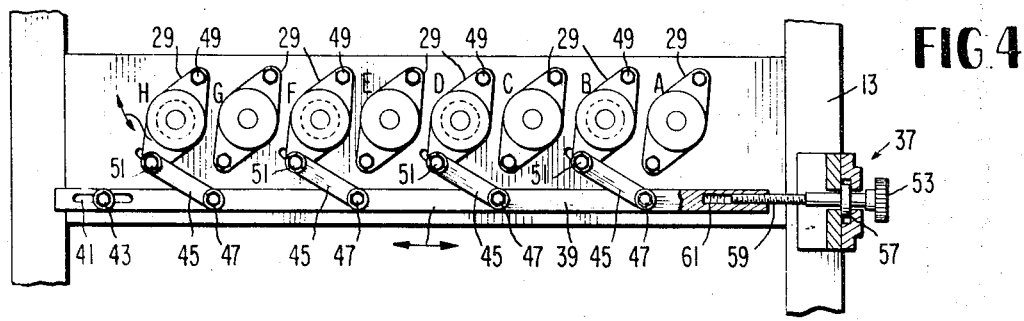
FIG. 4 is an end view in partial section taken along lines 4—4 of FIG. 1 showing the adjustment mechanism.

Referring to FIGS. 1–4, there is shown a preferred from of a shrimp sorting apparatus 11 according to the present invention.

The sorting machine includes a frame 13 which serves to support and position a plurality of pairs of substantially cylindrical spindles 15. The frame 13 is a generally rectangular structure having four downwardly projecting legs 17 in engagement with the floor. This frame may be comprised of square metal stock which may be appropriately joined at the corners thereof, such as by welding. The spindles 15 are inclined downwardly from a loading area 19 on the sorting machine 11 toward an opposing frame end indicated at 21.

The pairs of spindles 15 are substantially parallel and extend longitudinally within the frame 13. They rotate about a longitudinal axis extending from zone 19 to area 21. These spindles comprise cylindrical sections of progressively decreasing diameters starting with the largest diameter at the loading zone 19 to the smallest diameter at the opposing frame end 21. The pairs of spindles 15 form a plurality of slots or size grading regions 28 therebetween. The smallest grading region occurs where the spindles are of the largest diameter, zone 19, and the largest grading region occurs where the spindle diameter is the smallest, at 21. As can be more clearly seen in FIG. 3, the spindle pairs rotate in opposite directions to one another with facing surfaces moving upwardly.

The number of grading regions may be varied depending on processing requirements; however, at least six regions are customarily needed, and preferably ten grading regions should be provided. Utilizing spindles having a length of approximately 88 inches, for example, five regions of approximately 8 to 24 inches each and a sixth grading region, having a length of 8 inches, for jumbo shrimp, have been found satisfactory. It is preferable to have the smallest grading region somewhat longer than the others so that the shrimp may move along a sufficient spindle length to properly position themselves after being loaded in zone 19 before moving to the second grading regions.

The diameters of the spindle steps may be of any dimension where suitable grading accuracy is provided. For example, where the spindles are on 4 inch centers, the largest diameter may be 3.563 inches with successively smaller diameter steps of 3.438; 3,375; 3.313; 3.175, to a smallest diameter of 2.875 inches which is sufficiently large to pass the jumbo shrimp. With the axes of the spindles being rotated on 4 inch center lines, the machine can grade shrimp within an approximate range from a smaller size of 0.437 inches to a jumbo size of 1.125 inches, giving counts of from 10 to 35 or 40 shrimp per pound.

The spindles 15 are also provided with oppositely turned finishing surfaces 25 which act to urge the shrimp to move along the length of the spindles from the loading zone 19 to the opposite frame end at 21. This surface finish means 25 is arranged in a helical pattern that spirals in opposite directions for each spindle 15 of a grading pair. The shrimp stand generally upright between these spindles and move without substantial bouncing along the length thereof. A helical rib is formed by this finish to positively urge the shrimp along the grader 11 to a region where the spacing between the spindles is the largest. This surface finish may, for example, be of approximately 200 threads per inch and be of a depth of about two thousandths of an inch. However, surface finishes of 100 threads per inch to 250 threads per inch and depths of as much as three thousandths of an inch may be found to be suitable in certain instances.

The spindles 15 are mounted for rotation in bearing housings 29 at the lower end 21 of the frame 13 and are also suitably rotationally mounted at the loading zone 19. The spindles are driven by means of an electric motor 31 mounted on the end 21 of the frame 13. A belt 33 drives the spindles from this motor. This motor, in the preferred embodiment, is approximately 5 h.p., and rotates the spindles at approximately 460 r.p.m. This speed has been found to be most suitable in moving the shrimp at about the maximum practical rate. However, any speed up to about 500 r.p.m. may likewise be appropriate. It has been found that excessively high speeds of rotation may cause tearing of the shrimp.

The first spindle nearest motor 31 is driven directly by the motor 31 with the other spindles being frictionally or otherwise suitably driven from this first spindle. An arrangement such as this is shown with a drive train having rubber rollers 35, at the loading zone 19. Rubber has been found to be suitable for use as a resilient material in the drive train. However, alternate fiber and cast iron gears may also be used.

Adjustment means 37 (see FIG. 4) are provided at the bearing housings 29 so that the spindles 15 of the pairs may be spaced relative to one another. Fine adjustments of this nature may be made to compensate for a particular shrimp catch or the grading requirements of the shrimp processor. The adjustment means 37 includes a transversely extending slide bar 39 which slides along a portion of the frame 13. A slot 41 and pin 43 are provided for this purpose; however, a projection on the sliding bar itself mating with a keyway on the frame 13 would also provide the desired longitudinal sliding movement of the bar 39. This bar includes linkage members 45 which are pivotally secured thereto as by means of pins 47. Alternate ones of the bearings 29 are fixedly secured to the frame 13 and are indicated at A, C, E and G. Bolts 49, however, serve to suitably pivotally fasten the upper portions of the bearing housings B, D, F and H to the frame 13. Pins 51 secure the other ends of these bearings to the linkage members 45.

A hand wheel 53 has a shaft 59 which extends through the frame and is rotatable relative to the frame 13. Shoulders 57 on shaft 59 may be provided to prevent axial movement of shaft 59. A threaded portion on shaft 59 is received into a mating threaded hole 61 in slide bar 39. Rotation of the hand wheel will cause the car 39 to move transversely relative to the frame as the threads of the hole 61 move along the shaft 59. This sliding movement of the bar 39 will in turn cause the linkages 45 to pivot the bearing housings B, D, F and H, and their associated spindles, about the bolts 49. The spacing between the spindle pairs can thus be precisely varied by rotation of the wheel 53 in the desired direction.

As previously noted, the spindle associated with fixed bearing housing A is driven by motor 31. The resilient frictional drive roller A', associated with bearing A, also is not movable laterally. Also, drive train members indicated as C', E', and G' do not move laterally, and are at an opposite end of the corresponding abovedescribed bearings C, E and G.

The train members B', D', F' and H', however, move only slightly in response to adjustment means 37 and movement of the shafts in the corresponding bearings B, D and H at the opposite frame end. Maximum adjustment is limited to that displacement which can be accommodated by the resiliency of drive rolls 35. Thus, no slippage is experienced even under maximum adjustment. The resiliency of the rolls 35 also contributes greatly in keeping the machine 11 free from noise during the sorting operation. Rubber, as noted, has been found to be most suitable for the drive members 35. It can be appreciated that the movement of alternate ones of the drive members 35 is very slight due to the relatively long spindles employed.

Below each of the stepped portions of the rollers 15, means for collecting shrimp falling through the grading regions is provided. Shrimp of different sizes are thereby kept in separate locations. This collecting means includes hoppers 63 having exit chutes 65 extending therefrom. Six hoppers are provided to coincide with the six grading regions. The shrimp falling through these regions exit by means of chutes 65 into buckets or other suitable containers (not shown) for subsequent processing.

Extending lengthwise of and over the adjacent spindle pairs are inverted V-shaped troughs 67 (see FIG. 3) which are disposed so as to have lower portions adjacent to and preferably contacting the upper surfaces of the spindles. These troughs 67 form, with the spindles 15, channels of a generally V-shaped form, at the bottoms of which are the grading regions. The troughs are provided with wiper members 69 which are sheets of material mounted for loose sliding movement between a bifurcated portion 70 of the trough member and by gravity and rub against the spindles 15 during rotation thereof. These wiper members 69 are preferably constructed of a plastic material such as polytetrafluoroethylene (Teflon) and allowed to rest against the upper surface of the spindles. The troughs 67 and wiper members 69 associated therewith serve to guide the shrimp into the grading regions and to prevent the shrimp from sticking to the rotating spindles. They also prevent jamming of the machine which may be caused by shrimp leaving the grading regions. The troughs 67 are suspended above the spindles and are maintained in a fixed position being supported by portions of the frame 13.

Water is supplied through pipes 71 which extend along the upper edge of the troughs 67. These pipes distribute the water to a plurality of orifices which serve to spray the water out and down so as to contact the spindle surfaces. The shrimp are washed by this water spray and the entire spindle assembly is kept lubricated and clean during the grading operation.

The sorting machine 11 includes loading means or conveyor 75 which loads shrimp from a receiving area 77 into which shrimp are dumped in batches. A tank 79 is usually filled with water to keep the shrimp substantially immersed until they are conveyed from the receiving area.

The conveyor 75 is driven by a variable speed motor 81. This motor is mounted on a platform 83 on the frame 13. A belt 85 transmits the rotation from the motor to a conveyor drive sprocket assembly 87. The conveyor 75 is comprised preferably of a metallic mesh endless belt 89. Belt 89 is wrapped around the upper driven sprocket assembly 87 and a lower, freely rotating sprocket assembly 97, the shafts of which are mounted in a conveyor frame. If the belt 89 is a mesh, the openings should be sufficiently small to prevent shrimp from sticking to it. Parallel spaced, horizontally extending, inverted V-shaped members 91 are spaced along the length of the conveyor 75 and extend across the width of belt 89. Members 89 are provided with loading surfaces 93 having a dimension of about one inch, as illustrated in FIG. 1, which actually support the shrimp during their movement up the conveyor 75 to the loading zone 19 of the spindles. The shrimp thus lie on members 95. Any tendency of the shrimp to pile up is avoided and thus no matter how many shrimp may be in receiving area 77, only a limited number will be loaded onto the spindles.

The V-shaped loading members 91 have two legs which are angularly related and joined at an apex. Members 91 are secured to belt 89 by a plate-like member 90. Member 90 is secured to extend perpendicularly from the surface of belt 89. The outer end of member 90 is secured, as by spot welding, to the apex of loading member 91.

A shrimp receiving frame or bin 99 extends outwardly from the lower end of the endless belt 89 and acts as a basket to hold the shrimp in area 77 until they are lifted and carried upon the loading surfaces 93 of the steps 91. The number of shrimp carried by the conveyor may be varied by adjusting the speed of the aforementioned variable speed motor 37 and by an adjustment means 101 to be subsequently described.

The adjustment means 101 is provided to establish the optimum slope of the conveyor to assure a properly controlled shrimp delivery rate. Once the angle of the conveyor is properly set, there is little need to change it. The adjustment means, if used, may comprise a pair of screw assemblies which act between the lower wall of the tank 79 and the conveyor 75 to provide for relative motion therebetween. Operation of this adjustment means causes the conveyor 75 to pivot about an axis at the sprocket assembly carrying with it the frame 99 and the shrimp contained therein.

It will be understood that as the conveyor is pivoted so as to approach a more horizontal position, the amount of shrimp being carried on the loading surfaces 93 may be increased. On the other hand, a more vertical position of the conveyor 75 will lower the volume of shrimp being carried since the shrimp will tend to slip off the now inclined loading surfaces 93. FIG. 1 is illustrative of an intermediate position with the loading surfaces 93 being positioned in a substantially hrozontal plane.

OPERATION AND SUMMARY OF ADVANTAGES

In the operation of the shrimp sorting machine as above disclosed, batches of shrimp are deposited into the receiving area 77 so that they are placed against the lower portions of the conveyor 75 and within the basket-like frame 99. The shrimp are picked up on the loading surface members 91 and travel upwardly along the conveyor to the loading zone indicated generally at 19. The pitch or slope of the conveyor is suitably adjusted by means of hand wheels 109 so that the number of shrimp delivered at the loading zone 19 does not exceed the number which can become properly oriented for accurate grading. Suitable adjustments may also be made to vary the speed of the motor 81, depending on the size mix of the shrimp being graded.

It is essential for accurate grading to keep the shrimp spread out along the space between the grading spindles. It can be appreciated that for high production, the shrimp are delivered in substantially equal volumes to the four pairs of spindles. As previously noted, the tank 79 is filled with water thereby aiding in keeping the shrimp in a non-sticky condition as they travel upwardly upon the conveyor 75.

The shrimp, which have been delivered and evenly spread out along the spindles, travel along the length of the spindles in an appropriate trough. These troughs have wiper members 69 which rub against the upper spindle surfaces and facilitate feeding of the shrimp into the grading regions formed between the spindle pairs. The first stepped section or grading region between the spindles is of a suitable length to properly position the shrimp between the spindles. Shrimp having a tapered body being larger at the head portion and tapered inwardly to their tails are caused by gravity to drop with their tails lowermost between each pair of spindles. Therefore, the shrimp, due to their shape and mass, enter the slots between the rollers with their tails dangling therebetween. Thus, the shoulders or wider portions of the shrimp extend upwardly out of the spindle slots. As noted, water is sprayed on the shrimp and the spindles during the grading operation.

The shrimp of different sizes having different shoulder dimensions drop through the slots formed between the parallel spindles 15 at different points along the length thereof. As previously noted, chutes are provided at each step to maintain the shrimp in segregated collecting regions for subsequent processing. Shrimp are graded by size or count, which separates the shrimp according to their quantity per pound.

Each spindle utilized to form a grading region is rotated in opposite directions upwardly along their peripheries which face another. This opposite upward rotation causes the shrimp to stand up within the slots formed between the spindles in a gernally vertical manner. The screw-like finish applied to the surface of the spindles positively urges the shrimp downwardly toward the larger grading regions. The shrimp are gently handled between these spindles and thus kept free from damage during the grading operation. The shrimp are thus caused to remain in substantially constant contact with the spindles during the grading thereof without bouncing. The shrimp are screw-fed with gravity assist from the first stepped portion of the spindles 15 downwardly until they fall through a grading region of appropriate width. This positive feed maintains the spacing between the shrimp and avoids interference and bunching of the product. The spindle pairs are usually suitably spaced to provide from six to ten appropriate grading regions.

Due to variations in seasonal catches and for fine adjustments, an adjustment may be made to vary the widths of the grading regions. This adjustment is made by rotating the handwheel 53 and causing the pivoting of alternate spindles away from or toward spindles having a fixed axis. Adjustments of one hundredth of an inch may vary the count by as much as four shrimp per pound. In the preferred embodiment, the smallest, or first, grading region may collect shrimp having a count of more than 60 per pound, with the largest grading region collecting jumbo shrimp. An important feature of the present invention is the ability to accurately grade all the shrimp passing through the machine on the first pass.

Particularly significant is the method and apparatus for keeping the shrimp in contact with the oppositely rotating spindles during their movement from the smallest to the largest grading region. Also, it is significant that the screw-like finish on the spindles, together with the assist from the slope of the spindles, serves to positively feed the shrimp positioned therebetween without substantial bouncing which results from the use of oval-shaped spindles of the prior shrimp grading machines.

Also of significance is the utilization of a loading apparatus which is adjustable to limit the volume of shrimp being delivered to the loading regions between the spindles. The step-like members 101 on the conveyor have loading surfaces of limited area which carry the shrimp from a receiving area to the loading zone 19 above the spindles. By limiting the rate of feed, the shrimp get accurately positioned between the spindles without being piled one on top of another.

Also of importance is the precision adjustment mechanism for changing the spacing between the spindles and the drive associated therewith. Adjustments are made to alternate ones of the spindles and at an end opposite from that of the various spindle drives. The diameters of each grading section have been scientifically calculated from empirical data so that only slight adjustment is necessary to get the precision required by the commercial marketplace. This adjustment arrangement advantageously isolates the driven rollers from any large variation in lateral alignment during adjustment of the grading regions.

The present invention may be embodied in other specific forms without departing from the spirit or essential characteristics thereof. The presently disclosed embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A machine for sorting shrimp according to size comprising:
   a main frame;
   at least one pair of spindles extending longitudinally within said frame and sloping downwardly from a first end to a second end of said frame;
   drive means for rotating said spindles in opposite directions with facing surfaces moving upwardly;
   said spindles having substantially parallel axes and at least six sections each having precisely cylindrical outer surfaces of progressively decreasing diameter starting with the largest diameter at said first frame end to the smallest diameter at said second frame end and forming at least six size grading regions therebetween, said cylindrical outer surfaces including helical rib means arranged to urge shrimp along the length of said spindles from said first frame end to said second frame end;
   a non-rotatable member having a surface adjacent an upper portion of each spindle and extending along each of said cylindrical sections to prevent shrimp that may stick to a spindle from leaving the region between the pair of spindles;
   liquid spray means mounted to said frame above said spindles;
   means for loading shrimp to be graded on said spindles at said first end of said frame; and
   means for separately collecting shrimp falling through the grading regions of different size.

2. A machine for sorting shrimp according to size comprising:
   a main frame;
   at least one pair of spindles extending longitudinally within said frame and sloping downwardly from a first end to a second end of said frame;
   drive means for rotating said spindles in opposite directions with facing surfaces moving upwardly;
   said spindles having substantially parallel axes and at least six sections each having precisely cylindrical outer surfaces of progressively decreasing diameter starting with the largest diameter at said first frame end to the smallest diameter at said second frame end and forming at least six size grading regions therebetween;
   a non-rotatable member having a surface adjacent an upper portion of each spindle and extending along each of said cylindrical sections to prevent shrimp that may stick to a spindle from leaving the region between the pair of spindles;
   liquid spray means mounted to said frame above said spindles;
   means for loading shrimp to be graded on said spindles at said first end of said frame;
   means for separately collecting shrimp falling through the grading regions of different size; and
   said loading means comprising:
   an endless conveyor including a frame having an upper end and a lower end with the upper end being mounted on said main frame above said spindles;
   an endless belt of flexible material having openings therein of a size sufficiently small to prevent shrimp from adhering thereto and extending around the upper and lower ends of said conveyor frame;
   a plurality of spaced, horizontally extending members secured to said endless belt and having loading surfaces extending approximately one inch at an angle of approximately 45° from the surface of said belt for supporting shrimp being conveyed to said spindles;
   a variable speed motor drivingly connected to said endless belt; and
   adjustment means acting between said conveyor frame and said main frame for changing the slope of said endless belt.

3. The machine according to claim 2 wherein said horizontally extending members have a V-shaped cross section including an apex, and further comprise a flat, rigid, plate-like member extending substantially perpendicularly from said endless belt and having one edge secured to said endless belt with the other edge extending to and being secured at the apex of the horizontally extending member.

4. A machine for sorting shrimp according to size comprising:
   a main frame;
   at least one pair of spindles extending longitudinally within said frame and sloping downwardly from a first end to a second end of said frame;
   drive means for rotating said spindles in opposite directions with facing surfaces moving upwardly,
   said spindles having substantially parallel axes and at least six sections each having precisely cylindrical outer surfaces of progressively decreasing diameter starting with the largest diameter at said first frame end to the smallest diameter at said second frame end and forming at least six size grading regions therebetween;
   a plurality of bearing means mounted on said frame means for rotatably mounting the ends of said spindles;

a pair of mutually engageable drive rolls mounted at common ends of said spindles;

at least one of said drive rolls comprising an elastically resilient material;

motor means for rotating one of the said mutually engageable drive rolls;

adjustment means connected to the bearing means of one of said spindle pairs at an end opposite said drive wheel for re-positioning this last-named bearing to provide an accurate adjustment of the size of the grading regions between said spindle pair;

said elastically resilient drive roll being yieldable in response to said adjustment while maintaining its driving engagement with the adjacent drive roll;

a non-rotatable member having a surface adjacent an upper portion of each spindle and extending along each of said cylindrical sections to prevent shrimp that may stick to a spindle from leaving the region between the pair of spindles;

liquid spray means mounted to said frame above said spindles;

means for loading shrimp to be graded on said spindles at said first end of said frame; and means for separately collecting shrimp falling through the grading regions of different size.

5. A machine for sorting shrimp according to size comprising:

a main frame;

a plurality of pairs of spindles extending longitudinally within said frame and sloping downwardly from a first end to a second end of said frame;

drive means for rotating said spindles in opposite directions with facing surfaces moving upwardly;

said spindles having substantially parallel axes and at least six sections each having precisely cylindrical outer surfaces of progressively decreasing diameter starting with the largest diameter at said first frame end to the smallest diameter at said second frame end and forming at least six size grading regions therebetween;

a non-rotatable member having a surface adjacent an upper portion of each spindle and extending along each of said cylindrical sections to prevent shrimp that may stick to a spindle from leaving the region between the pair of spindles;

liquid spray means mounted to said frame above said spindles;

means for loading shrimp to be graded on said spindles at said first end of said frame;

means for separately collecting shrimp falling through the grading regions of different size;

alternate ones of said spindles being mounted for rotation about fixed axes and having fixed bearing housings;

the other ones of said spindles being mounted for rotation about axes substantially parallel to said fixed axes and have adjustable bearing housings; and adjustment means cooperating with said adjustable bearing housings for adjustably positioning said other ones of said spindles to provide an accurate adjustment of the size of the grading regions between said spindle pairs, said adjustment means comprising a slide bar adapted for longitudinal sliding movement, a separate link member for each adjustable bearing housing, means for connecting said link member at one end to said slide bar and at another end to one of said adjustable bearing housings.

6. The machine according to claim 5 wherein said drive means includes:

an electric motor;

means interconnecting said motor to a first one of said spindles at the second end of said frame for rotating said spindle;

drive train means at the first end of said frame for driving the remaining spindles from said first rotating spindle;

said drive train means comprising resilient rubber rolls on the ends of each of said spindles and frictionally engaged to transmit rotation to said spindles; and said electric motor rotates said spindles at a speed up to about 500 r.p.m.

7. A machine for sorting shrimp according to size comprising:

a frame;

a plurality of pairs of opposing cylindrical spindles mounted on said frame and extending longitudinally therein;

drive means for rotating said spindles at one end thereof and in opposite directions with facing surfaces moving upwardly;

said spindles having cylindrical sections of varying diameters along the lengths of said spindles with size grading regions of varied spacing being formed therebetween;

each of said spindles including helical surface finish means on the periphery thereof spiralling in opposite directions for keeping said shrimp generally upright and moving without substantial bouncing along the length of said spindles; and adjustment means for varying the spindle spacing between one of said spindle pairs and thereby changing said grading region spacing formed therebetween, said adjustment means including:

pivotal bearings on alternate ones of said spindles;

a sliding bar positioned within said frame at the driven end of said spindles; and linking means interconnecting said sliding bar and said pivotal bearing being mounted for laterally shifting said bearings and spindles associated therewith about a bearing pivot axis.

8. The machine according to claim 7 wherein said drive means includes;

an electric motor;

means interconnecting said motor to a first one of said spindles at one end of said frame for rotating said spindle;

drive train means at another end of said frame for driving the remaining spindles from said first rotating spindle;

said drive train means comprising resilient rubber rolls on the ends of each of said spindles and frictionally engaged to transmit rotation to said spindles; and said electric motor rotates said spindles at a speed up to about 500 r.p.m.

9. A machine for sorting shrimp according to size comprising:

a frame;

four pairs of aluminum spindles extending longitudinally within said frame and sloping downwardly from a first end to a second end of said frame, the axes of said spindles being approximately 4 inches apart and providing two parallel troughs;

drive means for rotating said spindles in opposite directions at a speed of up to about 500 r.p.m. and with facing surfaces moving upwardly;

guide means extending above said spindles and having a lower portion which is closely adjacent to the upper portion of each spindle along substantially the entire length of said spindles, said lower portion being effective to prevent shrimp from sticking to said spindles;

said spindles having at least six sections each having precisely cylindrical outer surfaces of progressively decreasing diameter to provide grading regions of the same length for at least 6 inches with the spindle diameters being about 3.563 inches at a first grading regions, about 3.438 inches at a second grading region, about 3.375 inches at a third grading region, about 3.313 inches at a fourth grading region, about 3.175 inches at a fifth grading region, and sufficiently large at a sixth grading region to pass the largest size to be graded;

said spindles further being provided with oppositely turned finishing surfaces of between 100 and 200 threads per inch and being of a depth between two and three thousandths of an inch, said surfaces acting to urge said shrimp to move along the length of said spindles from said first frame end to said second frame end as the spindles rotate; and conveyor means for loading shrimp onto said spindles at a substantially uniform rate that is sufficiently slow as to allow the shrimp to be spread along the spaces between the spindles without piling up.

10. A shrimp grading machine comprising:

a frame;

a pair of opposing cylindrical spindles mounted on said frame for rotation in opposite directions to one another and having a stepped periphery to provide a plurality of size grading regions;

each of said spindles including helical surface finish means on the periphery thereof spiralling in opposite directions for keeping said shrimp generally upright and moving without substantial bouncing along the length of said spindles;

a first means for rotating said spindles;

means for separately collecting shrimp falling through the grading regions of different size;

a tank for holding liquid at one end of said frame;

conveyor means for continuously loading shrimp at a controlled rate from said tank to one end of said spindles, said conveyor having its lower end extending into said tank and its upper end located above said spindles;

said conveyor means comprising a continuous belt extending around said upper and lower ends and V-shaped loading members extending across the width of said belt, the lifting area of said loading members being sufficiently small to prevent loading of shrimp at a rate greater than can be processed by said spindles without the piling of shrimp at the spaces between said spindles; and a second drive means independent of said first drive means for controlling the operating speed of said conveyor.

11. A method of grading shrimp according to size in one pass through a grading machine comprising stepped spindles having precisely cylindrical outer surfaces which rotate in opposite directions with their facing surfaces moving upwardly and the axes of which are substantially parallel, said method comprising the steps of:

loading said shrimp on a pair of spindles at a controlled rate so as to prevent the shrimp from piling on top of each other;

engaging said shrimp with helical rib means located on the cylindrical outer surfaces of said spindles, thereby causing said shrimp to be advanced along the length of said spindles in substantially constant contact therewith without bouncing as they move through various grading regions;

arranging the grading regions to segregate always those shrimp that are the smallest among the shrimp remaining on the spindles at each grading region; and collecting said graded shrimp separately.

12. The method according to claim 11 wherein said loading step comprises conveying said shrimp by horizontal members on an endless belt, said horizontal members being sufficiently small to control the quantity of shrimp carried by each member of a predetermined size, adjusting the slope of the region of the endless belt which lifts the shrimp to be guided up to the loading area on the spindles, so that shrimp are not stacked in front of the horizontal members, and adjusting the speed of the endless belt to deliver shrimp no faster than the shrimp move along said spindles.

* * * * *